Jan. 31, 1967 P. J. GERMOND ETAL 3,301,957

UNATTENDED AUTOMATIC DIALING OF TELEPHONE NUMBERS

Filed Dec. 6, 1962 3 Sheets-Sheet 1

INVENTORS P. J. GERMOND
K. L. MAYER
BY J. P. Kearns
ATTORNEY

UNATTENDED AUTOMATIC DIALING OF TELEPHONE NUMBERS

Filed Dec. 6, 1962 3 Sheets-Sheet 3

United States Patent Office 3,301,957
Patented Jan. 31, 1967

3,301,957
UNATTENDED AUTOMATIC DIALING OF TELEPHONE NUMBERS

Paul J. Germond, Wall, and Karl L. Mayer, Lincroft, N.J., assignors to Bell Telephone Laboratories, Incorporated, New York, N.Y., a corporation of New York Filed Dec. 6, 1962, Ser. No. 242,765
10 Claims. (Cl. 179—3)

This invention relates to telephone dialing systems in general and to unattended, fully automatic, external-memory call-progress systems in particular.

With the increased application of data transmission in conjunction with the public switched voice telephone plant, it becomes highly desirable to make provision for complete unattended operation. Heretofore data calls between business machines have required the services of an attendant to set up the call. This operation involved the same steps used in setting up a voice call. It was necessary to lift the handset, listen for a dial tone, dial the called number, await the cessation of ringing, advise the called party that a data call is being made, and finally place the set in the data mode.

It is an object of this invention to perform all the steps of setting up a data call as just outlined on an unattended basis.

It is another object of this invention to enable a business machine equipped to generate and store data to originate its own data calls without the assistance of a human attendant.

It is a still further object of this invention to seize the central office line, outpulse dial digits in sequence, recognize completion of a through connection, and transfer the subscriber's line to a business machine and an associated data set.

It is another object of this invention to signal the business machine when a call cannot be completed for any reason, i.e., called party busy, dial tone not received and so forth.

It is still another object of this invention to terminate calls properly whether completed or not.

According to this invention a business-machine-controlled automatic telephone dialing system is provided. The system of the invention is divided into four functional units: (1) a business machine signal recognition and control means; (2) central office loop signal recognition and control means; (3) dial digit pulsing and control means; and (4) answer recognition and abandon call timing means. Responsive to a service request from the business machine the system presents an off-hook appearance to the telephone central office and waits for a dial-tone signal. Upon receipt of a dial go-ahead signal the system calls for successive called-party dial digits from the business machine and outpulses them one by one. An answering signal is continuously awaited from the called party and on receipt of this signal the data set is transferred to the central office line. A preset timer started with each dial digit request to the business machine can be reset by either the next digit presentation or the receipt of an answering signal from the called party. If the timer times out for any reason, an abandon-call signal is returned to the business machine. When the business machine removes the service request, the system goes on-hook to the telephone central office. Once the line has been transferred to the data set, the dialing system drops off the line and control of the termination of the call is transferred to the data set.

A feature of the invention is the logical control system which provides for central office loop seizure, dial tone and answer signal recognition, and data set mode control. A complete understanding of this invention and its various features and advantages will be obtained from a consideration of the following detailed description taken together with the accompanying drawing in which one embodiment of the invention is illustrated. It is to be understood that the drawing is for the purpose of illustration and description and is not to be construed as defining the limits of the invention.

Figure 2:
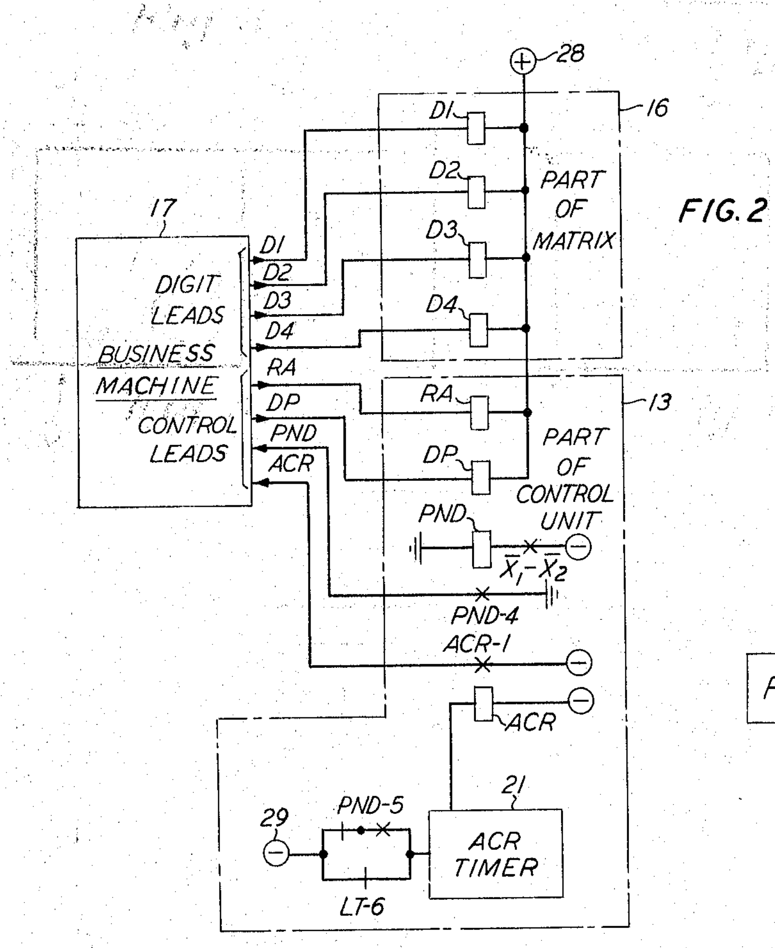
FIG. 2 is a schematic diagram of the control circuits linking the business machine and the automatic dialing system of this invention.
Figure 3:
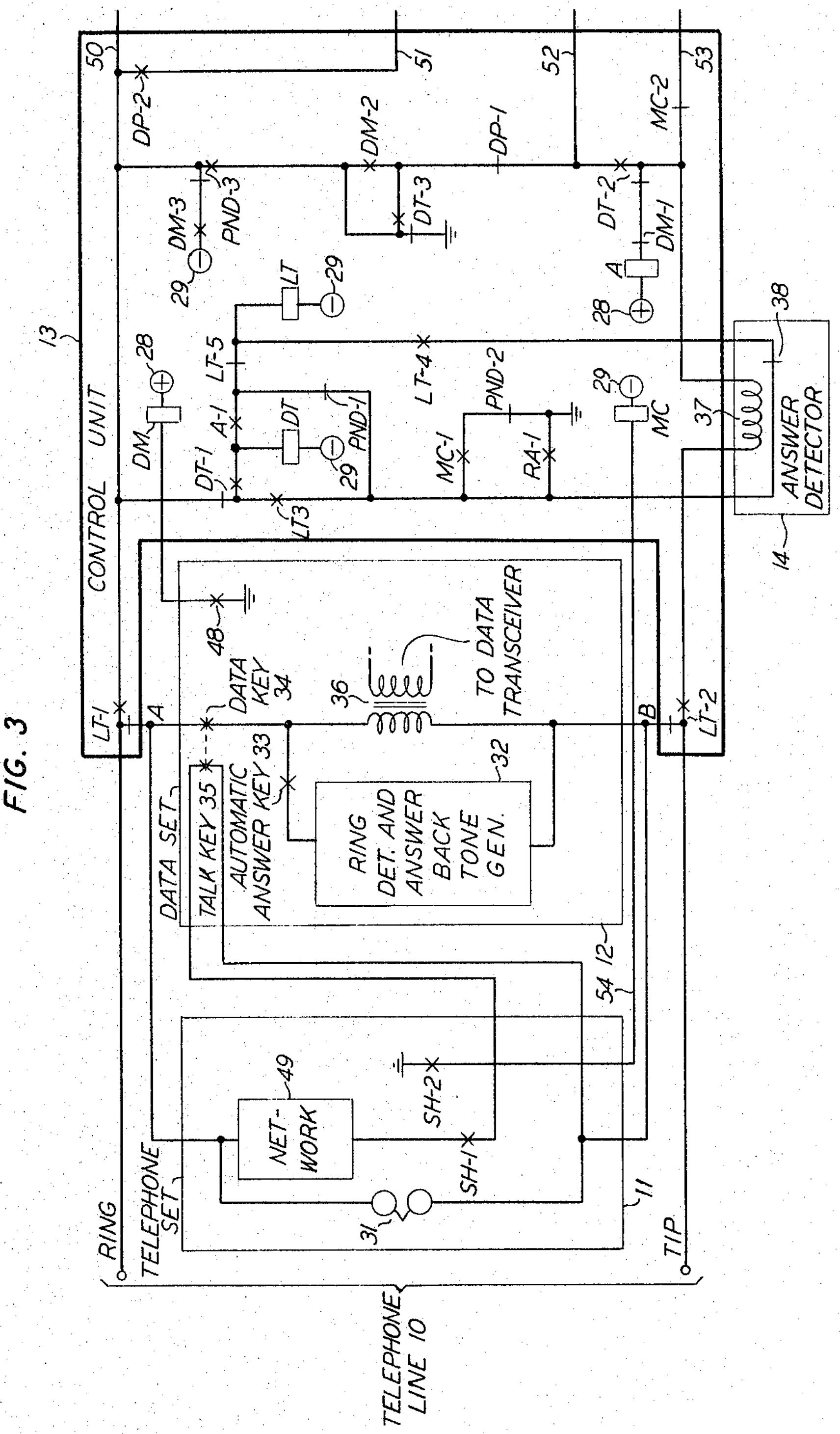
FIGS. 3 and 4 when joined as indicated in FIG. 5 constitute a schematic diagram of the automatic dialing system of this invention.
Figure 4:
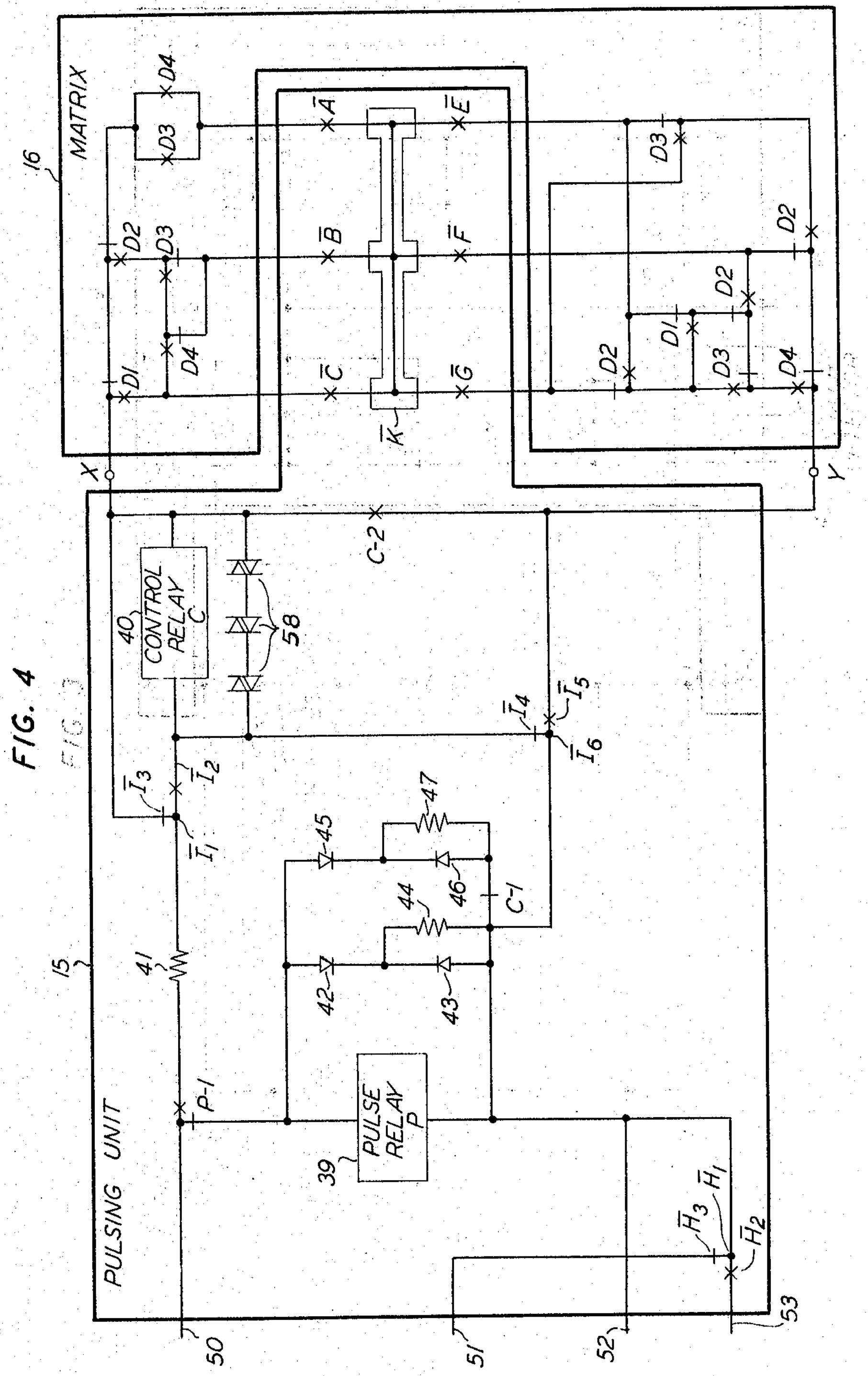

FIGS. 2, 3 and 4 of the drawing employ the detached contact type of drawing in which the contacts are shown in their functional relationship to the elements controlled thereby and the relay coils themselves are placed wherever it is logically convenient to show their operating paths. Normally open make-contacts are indicated by crosses in the circuit path. Normally closed break-contacts are indicated by a single stroke perpendicular to the circuit path. Transfer contacts are indicated by the combination of a make and break symbol. All contacts are designated by the relay letters and a numeral.

Figure 1:
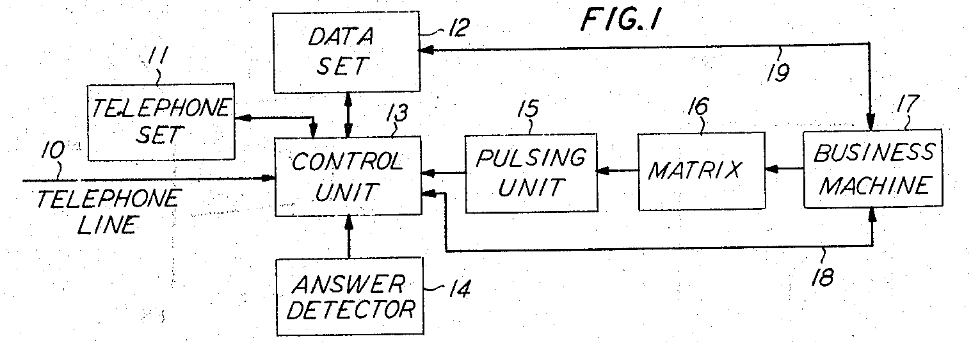
FIG. 1 is a block diagram of the overall automatic dialing system of the invention.

FIG. 1 shows in block form the major entities associated with the automatic dialing system of this invention in its broad aspect. To a conventional telephone subscriber's line 10 leading on the left to a telephone central office (not shown) are to be connected a data set 12 receiving and delivering business data over line 19 to a business machine 17. By business machine is meant any instrumentality for generating, processing and storing intelligence in the form of data, and also capable of performing mathematical manipulations on the data, if necessary.

Since this is a normal voice telephone line, a standard telephone set 11 is also shown. It is to be understood that telephone line 10 can be used for normal voice calls as well as data calls on an alternative basis. Data set 12 forms a link between business machine 17 and telephone line 10 by encoding the business machine signals into a form compatible with the transmission characteristics of the telephone line and by decoding line data signals into a form acceptable to the business machine. This invention is not concerned with this aspect of data transmission.

The purpose of this invention is to perform all the functions of setting up and controlling the progress of a data call on an unattended basis. To accomplish this purpose control unit 13, answer detector 14, pulsing unit 15 and matrix 16 are provided as shown in FIG. 1. Control unit 13 combines the functions of interpreting and acting on instructions from business machine 17 and generating appropriate answering signals over lead 18, of signaling off-hook status to the central office and recognizing dial go-ahead signals from the central office over line 10, and of transferring line 10 from pulsing unit 15 to data set 12 on receipt of an answering signal detected by answer detector 14. Pulsing unit 15 and matrix 16 together form a dial pulse generator of the proper number of impulses for each digit delivered to the matrix 16 by business machine 17. In this embodiment pulsing unit 15 is described as being of the electromechanical type described in the joint application of Ernest R. Andregg, William Pferd and Rembert R. Stokes, Serial No. 193,267, filed May 8, 1962, now United States Patent 3,189,692 issued June 15, 1965.

Without departing from the spirit of this invention pulsing unit 15 could be the multifrequency dial tone pulser disclosed in the application of L. A. Meacham, Serial No. 859,936, filed December 16, 1959 (United States Patent 3,064,084, issued November 13, 1962) now Reissue Patent 25,507 dated January 7, 1964. In this case matrix 16 would be modified in an obvious way.

Matrix 16 performs the function of converting the dial digits from a four-level binary-coded decimal form to a two-out-of-six form acceptable to the pulsing unit.

Answer detector 14 responds to a single-frequency signal generated in the called party's set when the latter goes off-hook. Control unit 13 then receives a signal from the answer detector and transfers telephone line 10 from pulsing unit 15 to data set 12.

*Overall operation*

FIG. 2 shows the interface between business machine 17 and matrix 16 and control unit 13. The normal sequence of operation in the automatic dialing unit of this invention is as follows. The business machine requests dialing service by grounding lead RA thus operating corresponding relay RA in the control unit from local battery as indicated by the encircled plus sign 28. Relay RA operated causes the system to go off-hook to the central office. The central office returns a dial go-ahead signal which is interpreted by parts of the control unit to be described later. The pulsing unit is brought into play and the present-next-digit (PND) relay operates from contacts $\overline{X}_1$–$\overline{X}_2$ in the pulsing unit. Business machine 17, seeing a ground on the PND lead because contact PND–4 has closed to ground, sets up the first called-party digit on leads D1 through D4. The called number may be programmed by the business machine in the manner of a teletypewriter address code at the head of a given message. This invention is not concerned with this aspect. At the same time digit-present relay DP is operated over lead DP. This operation signals the pulsing unit to read and outpulse the digit set up on matrix relays D1 through D4. As the digit outpulsing is completed the PND relay releases. The business machine sets up subsequent digits and the pulsing unit transmits them one at a time as the control unit and business machine exchange signals on leads PND and DP.

Abandon-call-and-retry timer 21 shown as part of control unit 13 is started initially by the opening of contact LT–6 which operates in conjunction with the RA relay as will be explained later. The timer runs for a nominal 40 seconds before relay ACR operates and delivers a closure to ground to business machine 17 over lead ACR through make-contact ACR–1. Each operation of the PND relay resets the timer to its initial condition through continuity transfer (make-before-break) contacts PND–5. After an answer is detected or the call is abandoned, contact LT–6 closes and holds the timer in the reset condition until the next call is made. The timer may employ a threshold circuit such as the well known Schmitt trigger controlled by a resistor-capacitor, time-constant circuit. The time-constant circuit is designed to require the desired amount of time delay to reach the voltage level of the trigger firing threshold.

*Detailed description*

Figure 5:
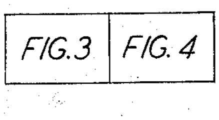

A detailed schematic diagram of an illustrative embodiment of the automatic dialer of this invention is shown in FIGS. 3 and 4 placed side by side as indicated in FIG. 5. Leads 50 through 53 on the two figures join when FIGS. 3 and 4 are properly positioned. These figures are divided into blocks having the same designations as the corresponding blocks in FIG. 1. Telephone line 10 is now shown with separate tip and ring leads.

Telephone set 11 is conventionally connected across the tip and ring leads of the line 10. However, this connection is made through the break-portion of transfer contacts LT–1 and LT–2 so that control unit 13 can busy the telephone set during automatic dialing operation and the pulsing unit to business machine 17 during voice calls. Terminals A and B designate the common junction between telephone set 11, data set 12, and control unit 13. Telephone set 11 includes a ringer 31 directly connected to terminals A and B and a network 49 connected to line 10 through switchhook contact SH–1. Network 49 block advantageously includes the handset and dial mechanism at a typical telephone set. Thus when talk key 35 is closed in data set 12 normal voice calls can be made over line 10. Telephone set 11 is modified to include an extra switchhook contact SH–2 which controls over lead 54 a manual-call relay MC whose contacts can effectively lock out pulsing unit 15.

Also bridged across the tip and ring leads through transfer contacts LT–1 and LT–2 at terminals A and B is data set 12. This data set is assumed to include a transceiver (not shown) for translating contact closures in the business machine into frequency-shift, phase-shift, or other suitable signals transmittable over a telephone line for data communication purposes. Relay contacts LT–1 and LT–2 are located in the control unit and the break contacts connect the data set to the telephone line except when the pulsing unit is being used. Data key 34 is placed in series with transformer 36 connecting to the data transceiver. Data key 34 may conveniently be mechanically interlocked with talk key 35 which controls telephone set 11 so that only one can be closed at a time. Data set 12 is shown to include a ringing current detector and answer-back tone generator generally designated 32. Element 32 is bridged across the line through automatic answer key 33 and data key 34. Thus, the data set can be set in the idle condition to receive ringing current and return answer-back tone. The latter tone can be generated in a keyed oscillator at a frequency within the voice frequency band. The ringing detector may be a relay with a rectifier bridge in series therewith such as are found in recording telephone answering sets. Data-mode relay DM located in the control unit operates from contact 48 as shown for signaling control unit 13 in a manner similar to relay MC in voice telephone set 11.

Control unit 13 is a relay logic circuit which is best described in terms of its operation hereinafter. The control unit has connections to all other elements of the complete subscriber's apparatus as will become apparent as the description proceeds.

Answer detector 14 is an adjunct to the control unit which responds to a tone signal of predetermined frequency and duration generated by the called party who has an answer-back tone generator similar to that shown generally as element 32 in data set 12. Answer detector 14 advantageously includes an input transformer, the input winding of which is designated 37, a resonant detector and an amplifier to operate a signaling relay further assumed to have at least a break contact 38 extending into the control unit. Input winding 37 is in series with line 10 when pulsing unit 15 is in use during a call origination sequence.

Pulsing unit 15 is shown for illustration as an electromechanical system similar to that disclosed in the aforesaid Andregg et al. application. The unit includes a self-stepping pulse (P) relay 39 powered directly from telephone line 10, and a latching control (C) relay 40 having magnetically biased reed switches which change state on current reversals. A rotary commutator with effectively sixteen segments comprising a phenolic tube with printed contact surfaces is stepped along by the pulse relay. Sixteen wire spring brushes ride the surface of the commutator to establish predetermined switching patterns as the drum rotates. The wire spring contacts are designated by the overlined letters A through I and X in FIGS. 2, 3, and 4. The physical layout is shown particularly in FIG. 13 of the Andregg et al. application, and in FIG. 14 thereof the developed contact surface of the rotary commutator is also shown. Contact designations used in the present description exactly match those in the cited application. The pulsing unit of the mentioned application is modified to the extent that the card reading sensors are omitted and in their place matrix 16 is connected to the digit switching portion of the commutator generally designated $\overline{K}$.

The rotary commutator assumes each of the sixteen successive positions for each digit pulsed. There is a home position to which the commutator must be returned before the pulsing unit stops and in which it remains until another dialing sequence begins. In this position and the next only contact $\overline{H}_1$ is closed to contact $\overline{H}_3$ so that line power is available to pulse relay 39 only when the business machine requests service and causes relay DP to operate. In all other positions contact $\overline{H}_1$ is closed to contact $\overline{H}_2$ and the pulse relay is connected directly across the line. On the first operation of the pulse relay the commutator steps once without change in the brush conditions. On the next operation the commutator steps off home position and in addition closes contact $\overline{X}_1$ to contact $\overline{X}_2$ (FIG. 2) thereby operating the PND relay. On all these first three positions the off-normal $\overline{I}$ contacts remain open and $\overline{I}_1$ is closed to $\overline{I}_3$ and $\overline{I}_4$, to $\overline{I}_6$. Line current flows through control relay 40 whenever the make-portion of contact P–1 closes on each operation of the pulse relay. However, the control relay is polarized so that it operates (closes its C–1 and C–2 contacts) only on negative current flowing from left to right in FIG. 4.

The ring lead is assumed to be negative with respect to the tip lead. Control relay 40 is a sensitive relay and for this reason a current-limiting resistor 41 is provided in its operating path and voltage-regulating diodes 48 are connected across its coil. This arrangement also makes the impedance between the tip and ring leads equal for both positions of transfer contacts P–1. The line loop therefore remains closed during the interdigital time. During the next ten digit-pulsing positions of the commutator conaacts $\overline{I}_1$–$\overline{I}_2$ and $\overline{I}_5$–$\overline{I}_6$ are closed. An operating path through the control relay can only be completed if there is continuity between points X and Y. These points are the terminals of matrix 16 and are closed only after the commutator drum has stepped beyond the digit encoded on matrix relays D1 through D4. The control relay then operates to shunt line current around the open contact of the pulse relay and thereby blanks the remaining pulses through its own contact C–2. At the same time contact C–1 on the control relay opens to remove diodes 45 and 46 and resistor 47 from their shunt relationship with the coil of pulse relay 39. The network including diodes 42, 43, 45 and 46 and resistors 44 and 47 constitutes a two-speed timing system. This network as explained in the aforesaid Andregg et al. application shunts different magnitudes of current around the pulse relay coil thereby controlling the relay current and hence the speed of armature operation. During digit-pulsing the complete network is operative and the speed of operation of the relay is held to approximately ten pulses per second. During the blanking period, however, when the control relay operates only diodes 42 and 43 and resistor 44 are effective in the circuit and the pulse relay increases its pulsing rate to about twenty per second.

During the digit pulsing sequence the $\overline{K}$ contact surface of the commutator drum is operating successively to provide through current paths among contacts $\overline{A}$ through $\overline{C}$ and $\overline{E}$ through $\overline{F}$ as follows:

Step 4, contacts $\overline{A}$ and $\overline{E}$
Step 5, contacts $\overline{A}$ and $\overline{F}$
Step 6, contacts $\overline{A}$ and $\overline{G}$
Step 7, contacts $\overline{B}$ and $\overline{E}$
Step 8, contacts $\overline{B}$ and $\overline{F}$
Step 9, contacts $\overline{B}$ and $\overline{G}$
Step 10, contacts $\overline{C}$ and $\overline{E}$
Step 11, contacts $\overline{C}$ and $\overline{F}$ and
Step 12, contacts $\overline{C}$ and $\overline{G}$.

Once control relay 40 operates on one of the above steps, it holds itself operated through its own contact C–2 until the $\overline{I}$ make-contacts are opened at the end of the digit-pulsing period.

On the last three commutator positions the $\overline{I}$ contacts return to their off-normal position and the control relay releases because of the reversal of current flow. The speed timing network returns to its ten-pulse-per-second speed and the pulsing unit steps to home position to await the next digit.

In the matrix a four-level, binary system is used to encode each digit, while in the drum a two-out-of-six code is used. This may be summarized in the following Table I. The most significant bit occurs on relay D1. X's in the table indicate operation of a relay or closure of a switch. No entry indicates a non-operated relay or an open switch.

TABLE I

| Digit | Relays | | | | Drum Positions | Drum Switches | | | | | |
|---|---|---|---|---|---|---|---|---|---|---|---|
| | D1 | D2 | D3 | D4 | | $\overline{A}$ | $\overline{B}$ | $\overline{C}$ | $\overline{E}$ | $\overline{F}$ | $\overline{G}$ |
| 1 | | | | X | 4 | X | | | X | | |
| 2 | | | X | | 5 | X | | | | X | |
| 3 | | | X | X | 6 | X | | | | | X |
| 4 | | X | | | 7 | | X | | X | | |
| 5 | | X | | X | 8 | | X | | | X | |
| 6 | | X | X | | 9 | | X | | | | X |
| 7 | | X | X | X | 10 | | | X | X | | |
| 8 | X | | | | 11 | | | X | | X | |
| 9 | X | | | X | 12 | | | X | | | X |
| 0 | No relays operated. | | | | 13 | All switches open. | | | | | |

Matrix 16 itself is made up according to well known logic principles and the path closure for each digit between points X and Y can readily be traced on FIG. 4.

A typical sequence of operations can now be described. Reference will be made to FIGS. 2, 3 and 4.

*Voice telephone call*

A voice telephone call is placed in the normal manner as for any key set. Telephone set 11 is bridged across the tip and ring leads of telephone line 10 through the normally closed break-portions of transfer contacts LT–1 and LT–2. Talk key 35 in data set 12 is closed and the handset is lifted from its cradle. The talk key, being interlocked with data key 34, prevents concurrent connection of data set 12 to telephone line 10.

Relay MC is operated by switchhook contact SH–2 and the tip lead connection to pulsing unit 15 is broken through its contact MC–2 on FIG. 3, thereby preventing full operation of pulsing unit 15.

However, contact MC–1 operates in control unit 13 to close a path to ground to line-transfer relay LT through break contacts PND–1 and PND–2 and break contact LT–5. Relay LT locks to ground through its own make-contact LT–4, MC–1 make contact, PND–2 break contact and break contact 38 in answer detector 14 thereby closing the tip and ring leads on make-portions of transfer contacts LT–1 and LT–2 toward pulsing unit 15. The same ground is also placed on the ring lead through contact LT–3 as a seizure signal to the telephone central office. The central office returns a ground on the tip lead as a dial go-ahead signal and operates relay A over an obvious path. The operation of relay A closes its contact A–1 and completes a path to ground over PND–1, MC–1 and PND–2 for dial-tone relay DT, which operates and locks through the make portion of its own DT–1 contact and removes ground from the ring lead. Through the closure of transfer contact DT–2 the tip lead is connected temporarily to pulse relay 39, thereby bridging the latter relay across the telephone line and allows relay A to release. The pulse relay operates and steps the drum commutator off home position and operates the present-next-digit relay PND in FIG. 2 by closing contacts $\overline{X}_1$ and $\overline{X}_2$. Contact PND–4 of the latter relay closes a ground to business machines 17 as a busy signal on lead PND. The other PND contacts previously mentioned open and release relays DT and LT. The telephone line is returned to the telephone set and dial tone is heard. The called party can now be dialed in the usual way. The pulsing unit is prevented from stepping farther because of the open break contact MC–2. At the end of the telephone call the handset is returned to its cradle and the switchhook contacts open to release the MC relay and allow the pulse relay to step to home position from ground on lead 50 through PND–3 make-portion and DT–3 break-portion. Local battery power is available to the pulse relay in series with the coil of the A relay over break contacts DM–1, MC–2, break-portion of transfer contact DT–2 and home contact $\overline{H}_1$–$\overline{H}_2$. Relay PND finally releases and the dialing unit becomes idle. Therefore, there is no interference from either the data set or the dialing unit with a voice telephone call. At the same time the dialing or pulsing unit is busied to the business machine. The sequence described following the return of the handset to its cradle occurs in about a second. Ringer 31 is operative anytime the dialer is not in use.

*Manual data call*

Data set 12 can be operated by an attendant for establishing calls through the normal dial on the telephone set portion as described above. After the connection is established, data key 34 is depressed thereby releasing talk key 35 and connecting data set transformer 36 across the tip and ring leads through the break portion of transfer contacts LT–1 and LT–2. The handset can then be replaced in its cradle without opening the line connection. At the same time data-mode relay DM can be operated in any convenient way through contact 48. The latter may advantageously be ganged with data key 34 and alternatively operated by the ring detector also. Its contact DM–1 opens in series with the relay A to prevent the pulsing unit from operating beyond the first three positions of the drum. Nevertheless, the PND relay remains on to make the dialer busy to the business machine. Upon completion of the data call, relay DM releases to connect local battery through relay A and DM–1 contact to pulse relay 39, which operates and steps to the home position of the commutator.

The data set may be left in the automatic unattended answering mode by closing data key 34 and automatic answering key 33. Then ring detector and answering tone generator 32 are ready to receive incoming data calls from another manual or automatic dial data set.

*Automatic call dialing*

When the automatic dialing system is in the idle state all relays in control unit 13, pulsing unit 15 and matrix 16 are released. In addition, the commutator drum in the pulsing unit is in home position. There is no connection between the pulsing unit and the telephone line since the make-portions contacts LT–1 and LT–2 are open.

There are eight control leads interconnecting business machine 17 and the automatic dialing system as shown in FIG. 2. All digit leads D1 through D4 pass from the business machine to the matrix. Lead RA requests automatic dialing service. Lead DP indicates that a digit is encoded on leads D1 through D4. Lead PND signals the business machine that the dialer is ready to outpulse each digit. Lead ACR informs the business machine that a connection cannot be established and a retry is necessary.

Business machine 17 requests dialing service by grounding the RA lead, thereby operating relay RA from battery 28 in FIG. 2. Relay RA places ground through its make contact RA–1, break contacts PND–1 and LT–5 on line-transfer relay coil LT. Relay LT operates from local negative battery 29 and contacts LT–1 and LT–2 close the tip and ring leads through to the pulsing unit on leads 50 and 53. However, the pulsing unit cannot operate because home contacts $\overline{H}_1$–$\overline{H}_2$ are open. The ground at contact RA–1 appears on the ring lead through make-contact LT–3 and break-portion of transfer contacts DT–1 and make-portion of LT–1 as a seizure signal to the central office loop. Central office returns a dial go-ahead signal when ready by grounding the tip lead. Relay A now operates from local positive battery 28 and ground through the make-portion of transfer contact LT–2, primary winding 37 in answer detector 14, break-portion of transfer contact DT–2 and break-contact DM–1. Relay A operated closes ground to the coil of dial-tone relay DT through its contact A–1, break contact PND–1 and make contact RA–1. Relay DT locks to this same ground through the make-portion of its own transfer contact DT–1 and make-contact LT–3. Operated relay DT opens the operate path to relay A on its transfer contact DT–2 and at the same time connects the tip lead over lead 52 to pulse relay 39. Opening of the break portion of its contact DT–1 removes ground from the ring lead. Pulse relay 39 is now bridged directly across the tip and ring leads through its own contact P–1 and will operate self-interrupted on line current. As previously explained the pulse relay normally operates at a speed of ten pulses per second.

As soon as the pulse relay operates it steps the commutator one notch off home position. At this time the $\overline{I}$ contacts are undisturbed in their off-normal condition and a completed path is maintained between tip and ring leads until the fourth commutator position through control relay 40 is reached. The latter relay, being polarized, does not operate, however, on this current direction. Initial operations of the pulse relay are nevertheless blanked to the line.

Relay PND, being initially off, has already signaled the business machine to set up the first digit on relays D1 through D4 in matrix 16. Relay PND has operated through $\overline{X}_1$–$\overline{X}_2$ on the commutator drum on the third step from home position and has closed a shunt path around the pulse relay through PND–3, DM–2, DP–1 until the business machine can signal digit present on lead DP which operates the digit-present relay DP. The operation of relay DP opens the shunt path previously established around pulse relay 39 by opening its break-contact DP–1.

The dial pulsing unit 15 now proceeds to send the digit set up on the matrix relays. The contacts in the matrix are established so that when the pulse relay has reached that digit a completed path is established between points X and Y and control relay 40 is operated to shunt the tip and ring leads and blank the remaining digit pulses. If the digit five were presented, for example, matrix relays D2 and D4 would be operated. A closed path can be traced between points X and Y when the commutator bridges contacts $\overline{B}$ and $\overline{F}$. This occurs on the eighth commutator position as recorded in Table I. Thereafter relay 40 is operated and contact C–2 shunts the tip and ring leads. Contact C–1 places the high-speed network around pulse relay 39 and the commutator is stepped home at 20 pulses per second. In home position the $\bar{I}$ contacts go off-normal to release the control relay and contacts $\bar{X}_1$–$\bar{X}_2$ also open to release the PND relay and open the PND lead to the business machine. This is interpreted as a signal to set up the next dial digit.

Line current is kept diverted from the pulse relay through contact DP–2 and the tip and ring lead bridged until the business machine has recognized the removal of the PND signal. The same sequence of events just described is repeated for each dial digit.

*Answer recognition*

Each time the PND relay goes on or off, due to the presence of make-before-break contact PND–5 in FIG. 2, the abandon-call-and-retry timer 21 is recycled. The timer runs for 40 seconds nominally. If the timer runs out either before the next digit is presented by the business machine or the answer signal from a called station is received, the ACR lead in FIG. 2 is turned on and the business machine must retry by releasing and then reoperating relay RA.

When relay PND is turned on after the last digit, the timer is reset and will time out unless relay LT releases. Answer detector 14 responds to a prearranged single frequency answering tone generated by a called party equipped to operate on an automatically dialed data call. Receipt of the answering tone opens contact 38 which is in the holding path of relay LT from ground through contacts RA–1 and LT–4. When relay LT releases the tip and ring leads are connected through the break portions of transfer contacts LT–2 and LT–1 to data set 12. Relay DT also releases. The ACR timer resets permanently to await the next call.

When a data call is successfully completed and the data set enters the data mode, relay DM in control unit 13 is operated on contact 48 and remains on until the transmission is over. Signals (with whose generation this invention is not concerned) are passed between the data set and the business machine to control the transmission and reception of actual messages. The pulse relay remains inactive until the data call is over and relay DM is released. Positive battery 28 applied through the coil of relay A and home contacts $\bar{H}_1$–$\bar{H}_2$ over lead 53 and ground through the break-portion of transfer contact DT–3 and the make-portion of transfer contact PND–3 over lead 50 allow the pulse relay to step back to home position.

Relay PND does not release until the home position is reached in about 1.3 seconds in order to prevent a second call attempt from being made before the central office has had time to tear down all connections. Break-contact PND–1 in series with make-contact RA–1 accomplishes this by preventing relay LT from operating when relay RA reoperates.

*Incoming call*

On an incoming call with the data set arranged for automatic answering, relay DM can be made operable by means of contact 48 from ringing detector 32. Make-contact DM–3 in series with the break-portion of PND–3 contact closes negative battery 29 to the ring side of pulse relay 39 over lead 50 and ground over the break-portion of contact DT–3, make-contact DM–2, break-contact DP–1 and lead 52. The commutator steps off home-position and reoperates relay PND to mark the pulsing unit busy to the business machine. At the same time break-contact DM–1 prevents relay A from operating to cause the operation of relay LT. As soon as relay PND operates the pulse relay is stopped and it will not resume until relay DM releases. At this time the commutator returns to home position.

While this invention has been described with reference to a particular illustrative embodiment, numerous other applications of the system to business-machine-controlled automatic dialing and call-progress situations will occur to those skilled in the art.

What is claimed is:

1. An automatic digit dialing control system comprising a telephone line, apparatus capable of processing intelligence over said telephone line and storing within itself the call digits of selected telephone subscribers in binary-coded decimal form, means responsive to a request-for-service signal from said apparatus for seizing said telephone line, means for outpulsing the successive call digits of a particular telephone subscriber in a normal dialing sequence, means interconnecting said apparatus and said outpulsing means for translating successive call digits from binary-coded decimal form to a form usable by said outpulsing means, and means connecting said apparatus to said telephone line upon completion of a dialing sequence.

2. In a telephone system, a business machine equipped to transmit and receive data messages and to store telephone call numbers of message addresses, a data terminal adapted to transfer digital data between said business machine and a telephone line, means included in said business machine for setting up the call number of a telephone subscriber to whom each outgoing message is addressed one digit at a time in binary-coded decimal form, a telephone line having tip and ring leads, a dial pulsing unit, means responsive to a request signal from said business machine for connecting said dial unit to said telephone line and placing a seizure signal on said ring lead, means responsive to a dial-tone-present indication on said tip lead for causing said dial unit to outpulse serially the digits of the called number presented by said setting-up means, means responsive to an answering tone from the called telephone subscriber for transferring said telephone line from said dial pulsing unit to said data terminal, and time-out means activated coincident with the outpulsing of each dial digit for delivering an abandon-call signal to said business machine whenever the answering tone is not received or the next digit presented within a preset time.

3. An automatic call-progress control system comprising a telephone subscriber line, a business machine for generating and storing intelligence, said machine also storing call numbers of telephone subscribers, a dialed-digit pulsing unit including means for interrupting an established telephone loop at a predetermined rate and means for blanking the line interruptions caused by said first means, a switching matrix interconnecting said business machine and said pulsing unit, said matrix being operative under the control of the stored called numbers in said business machine to cause the operation of said blanking means after said interrupting means has outpulsed the correct dial digit, data transfer apparatus capable of encoding intelligence from said business machine into a form compatible with the transmission characteristics of said telephone line and of decoding intelligence from said telephone line into a form compatible with the storage capabilities of said business machine, and control means for setting up and taking down connections among said telephone line, data transfer apparatus and pulsing unit comprising means responsive to a service request signal from said business machine for seizing said telephone line, means responsive to a dial go-ahead signal on said telephone line for connecting said pulsing unit to said telephone line, means operable on the completion of each digit transmission for signaling said business machine to deliver each successive dial digit to said matrix, means responsive to a digit-present signal from said business machine for operating the interrupting means in said pulsing unit, and means responsive to an answering signal from the called subscriber for transferring said telephone line from said pulsing unit to said data transfer apparatus.

4. The automatic call-progress control system according to claim 3 in which said business machine presents called-number digits in a four-level binary code, said matrix comprises four relays, one for each level of said binary code, the contacts of said relays are arranged to form six possible conductive paths, a unique two of which are closed for each decimal digit, and said pulsing unit includes a coded drum commutated along with each pulsation thereof and connecting in series the unique conductive paths across said pulsing unit on the proper pulsation to operate said blanking means.

5. The automatic call progress control system according to claim 3 in which a fixed duration timer is activated coincident with each signal to said business machine to deliver the next dial digit, a relay operated by said timer when it completes its cycle to signal said business machine to abandon a particular call, and means for resetting said timer severally responsive to the delivery of the next dial digit to said pulsing unit by said business machine and to the receipt of an answering signal from the called subscriber.

6. The automatic call progress control system according to claim 3 in which said means for seizing said telephone line includes a first electromagnetic relay directly operated by a service request signal from said business machine, a second electromagnetic relay operated by a contact to ground reference on said first relay, and transfer contacts on said second relay for connecting said telephone line to said control means and said contact to ground reference to one conductor only of said telephone line.

7. The automatic call-progress control system according to claim 3 in which said means for connecting said pulsing unit to said telephone line comprises an answering electromagnetic relay operable from a ground connection on one conductor of said telephone line, and a transfer electromagnetic relay operated from a contact on said answering relay and having a transfer contact to close the path between said telephone line and said pulsing unit.

8. The automatic call-progress control system according to claim 3 in which the means for signaling said business machine to deliver each successive dial digit to said matrix comprises an electromagnetic relay operated coincident with the cessation of pulsing by said pulsing unit.

9. In combination, a telephone line, a voice telephone set capable of being connected to said telephone line, a data translation set also capable of being connected to said telephone line, interlocking manual switch means for preventing simultaneous connection of said voice telephone and data sets to said telephone line, an information-processing machine connected to said data set having storage facilities for called telephone subscriber numbers in binary-coded decimal form, matrix means for converting dial digits from binary-coded decimal form to two-out-of-$n$ form, dial-pulsing means responsive to two-out-of-$n$ digits from said matrix means for outpulsing serially called telephone number digits over said telephone line on command from said information processing machine, and a control unit responsive to signals from said information processing machine and from said telephone line for setting up and taking down connections among said dial-pulsing means, said matrix means and said business machine and between said data set and said telephone line in an ordered sequence.

10. In combination, a telephone line, an information-processing machine capable of storing the call numbers of selected telephone subscribers in binary-coded decimal form, data apparatus capable of transferring coded information between said telephone line and said machine, and an automatic telephone call control system comprising means responsive to a request-for-service signal from said machine for seizing said telephone line, means responsive to a dial go-ahead signal from said telephone line for requesting from said machine the individual digits of a called telephone subscriber number in sequence, means for outpulsing each called telephone digit as a train of pulses, matrix means interconnecting said information-processing means and said outpulsing means for translating binary-coded decimal digits to a form acceptable to said outpulsing means, and means responsive to an answering signal from said telephone line when a complete call number has been outpulsed for connecting said data apparatus to said telephone line.

References Cited by the Examiner

UNITED STATES PATENTS

| | | | |
|---|---|---|---|
| 3,084,213 | 4/1963 | Lemelson | 179—4 X |
| 3,131,263 | 4/1964 | Le Cronier | 179—2 X |

DAVID G. REDINBAUGH, *Primary Examiner.*

S. J. GLASSMAN, *Assistant Examiner.*